United States Patent [19]

Schupp et al.

[11] Patent Number: 4,752,631
[45] Date of Patent: Jun. 21, 1988

[54] BINDERS FOR CATHODIC ELECTROCOATING

[75] Inventors: Eberhard Schupp, Schwetzingen; Rolf Osterloh, Gruenstadt; Werner Loch, Erpolzheim; Klaas Ahlers, Muenster, all of Fed. Rep. of Germany

[73] Assignee: BASF Aktiengesellschaft Patentabteilung, Ludwigshafen, Fed. Rep. of Germany

[21] Appl. No.: 934,625

[22] Filed: Nov. 25, 1986

[30] Foreign Application Priority Data

Nov. 29, 1985 [DE] Fed. Rep. of Germany ....... 3542168

[51] Int. Cl.$^4$ .............................................. C08L 63/02
[52] U.S. Cl. .................. 523/414; 204/181.7; 523/415; 523/416; 524/418; 524/901; 525/528; 525/533; 428/418
[58] Field of Search ............... 523/414, 416, 418, 415; 524/901; 525/528, 533; 428/418

[56] References Cited

U.S. PATENT DOCUMENTS

| 4,454,264 | 6/1984 | Patzschke et al. | 523/414 |
| 4,544,687 | 10/1985 | Schupp et al. | 523/414 |
| 4,557,976 | 12/1985 | Geist et al. | 428/413 |
| 4,568,729 | 2/1986 | Schupp et al. | 525/523 |
| 4,576,979 | 3/1986 | Schupp et al. | 523/404 |

FOREIGN PATENT DOCUMENTS 0012463  6/1982  European Pat. Off. .
0040867 11/1983  European Pat. Off. .
1303480  1/1973  United Kingdom .
1553036  9/1986  United Kingdom .

Primary Examiner—Theodore E. Pertilla
Attorney, Agent, or Firm—Keil & Weinkauf

[57] ABSTRACT

Binders for cathodic electrocoating which are based on polyadducts/polycondensates which carry basic nitrogen groups and are rendered water-dilutable by protonation with an acid, and one or more crosslinkng agents for these polyadducts/polycondensates, and their use.

These binders essentially consist of a mixture of
(A) from 50 to 90% by weight of a polyadduct/polycondensate which carries basic nitrogen groups and is obtainable by reacting
    (a) an adduct of a secondary amine and a polyepoxide compound, the adduct still containing free epoxide groups, with
    (b) a condensate which contains primary amino groups and is obtained from a primary diamine of not less than 4 carbon atoms and one or more mono- and/or dicarboxylic acids, one or more primary amino groups of the condensate (b) being used per free epoxide group of the adduct (a), and
(B) from 10 to 50% by weight of a crosslinking agent which does not react with component (A) at room temperature but reacts with the latter at elevated temperatures with crosslinking.

The binders are useful for the cathodic electrocoating of electrically conductive substrates and as coating materials.

8 Claims, No Drawings

BINDERS FOR CATHODIC ELECTROCOATING

BINDERS FOR CATHODIC ELECTROCOATING

The present invention relates to binders which are rendered water-dilutable by protonation with an acid and which are useful as coating materials and for the preparation of cathodic electrocoating finishes.

German Published Application DE-AS 2,057,799 describes a process for the cathodic electrophoretic deposition of a water-dispersed, ionic, organic resin which consists of a positively charged, amine-containing resin and a blocked, polyfunctional isocyanate.

European Pat. Nos. 12,463 and 40,867 disclose heat-curable coating materials which undergo crosslinking via a transesterification reaction. The crosslinking agents used contain $\beta$-hydroxy ester groups.

German Laid-Open Application DE-OS 2,737,375 disclosed reaction products of polyepoxy resins with polyamines which are reacted with not less than 2 moles of a monoepoxide or a $C_8$-$C_{24}$-monocarboxylic acid per mole of adduct, monoepoxides being preferred. Aminoplasts and phenoplasts are used as crosslinking agents.

German Laid-Open Application DE-OS No. 3,311,514 describes urea condensates which are suitable as binder components in heat-curable finishes. In Example 6 of this application, a urea condensate is used together with a condensate of a hexamethylenediamine/polyepoxide adduct and a dimerized fatty acid for the preparation of a cathodic electrocoating finish which possesses very good mechanical and anticorrosion properties at a baking temperature as low as 140° C. The only disadvantages of this binder are the slight surface roughness and a small tendency to sedimentation in the electrocoating bath.

It is an object of the present invention to overcome these disadvantages and retain the otherwise good properties, especially the bath pH of more than 7, which affords effective protection against plant corrosion. We have found that this object is achieved by the binder composition according to the invention.

The present invention relates to a binder for cathodic electrocoating which is based on polyadducts/polycondensates which contain basic nitrogen groups and are rendered water-dilutable by protonation with an acid and one or more crosslinking agents for these polyadducts/polycondensates, wherein the binder essentially consists of a mixture of (A) from 50 to 90% by weight of a polyadduct/polycondensate which carries basic nitrogen groups and is obtainable by reacting
  (a) an adduct of a secondary amine and polyepoxide compound, the adduct still containing free epoxide groups, with
  (b) a condensate which contains primary amino groups and is obtained from a primary diamine of not less than 4 carbon atoms and one or more mono- and/or dicarboxylic acids of not less than 6 carbon atoms, with the proviso that one or more primary amino groups of the condensate (b) are used per free epoxide group of the adduct (a), and (B) from 10 to 50% by weight of a crosslinking agent which does not react with component (A) at room temperature but reacts with the latter at elevated temperatures with crosslinking.

Novel binders in which, for the preparation of component (b), the dimer fatty acid is used as the dicarboxylic acid and/or the saturated or unsaturated fatty acid is used as the monocarboxylic acid are preferred.

Component (a) is preferably prepared using, as the secondary amine, a dialkylamine which contains 2 to 36 carbon atoms and may contain further functional groups.

Preferred crosslinking agents (B) are polyvalent blocked isocyanates, aminoplast resins or phenoplast resins, polyaminomethylated polyphenols, crosslinking agents which undergo curing via esteraminolysis and/or transesterification, and urea condensates.

The present invention furthermore relates to the use of the novel binder which is rendered water-dilutable by protonation with an acid, in the form of an aqueous dispersion which may contain pigments, organic solvents and/or further assistants, as coating agents, an aqueous cathodic electrocoating bath which contains from 5 to 30% by weight of the novel binder and an article which is provided with a coating and is obtained by applying the novel binder or coating agent and carrying out baking.

Regarding the components of the novel binder, the following may be stated specifically.

Component (A) is a polyadduct/polycondensate which carries basic nitrogen groups and is obtainable by reacting components (a) and (b).

Component (a) is an adduct of a secondary amine and a polyepoxide compound, the adduct still containing free epoxide groups.

The conventional glycidyl polyethers of polyhydricphenols can be used as polyepoxide compounds for the preparation of component (a). Examples of such polyhydricphenols are resorcinol, hydroquinone, p,p'-dihydroxyphenylpropane (bisphenol A), p,p'-dihydroxybenzophenone, p,p'-dihydroxydiphenyl, p,p'-dihydroxydiphenylethane, bis-(2-hydroxynaphthyl)-methane, 1,5-dihydroxynaphthylene and novolaks. Bisphenol A is preferred. The polyphenols can be converted to the polyepoxides by reaction with an epihalohydrin, in particular epichlorohydrin. Polyepoxides having a low molecular weight are formed when a large excess of an epihalohydrin is used, while those having a high molecular weight are obtained using a small amount of an epihalohydrin or by reacting a polyepoxide having a low molecular weight with a polyphenol. Diglycidyl ethers of bisphenol A, having an epoxide equivalent weight of about 180–2,500, are preferably used for the preparation of the novel binders.

To prepare component (a), the polyepoxides are reacted with secondary amines. The ratio of the number of equivalents of epoxide groups to that of amino groups can vary within wide limits and is in general from 1.1:1 to 10:1, preferably from 1.4:1 to 3.3:1. The reaction can be carried out in the presence or absence of a solvent. The reaction temperature and reaction time can be varied within certain limits and depends on the type of secondary amine used. For example, temperatures of from 20° to 200° C. are suitable, but it is advantageous to heat the mixture to 50° to 150° C. in order to achieve rapid reaction.

Suitable secondary amines for the preparation of component (a) are secondary monoamines, for example dialkylamines of 2 to 36 carbon atoms, e.g. dimethylamine or diethylamine, alkylalkanolamines, e.g. methylethanolamine, ethylethanolamine or methylisoprpanolamine, and dialkanolamines, such as diethanolamine or diisopropanolamine. The secondary monoamines may also contain further functional groups, provided that these do not interfere with the reaction of the secondary amines with the polyepoxides. The stated secondary monoamines can be employed alone or as a mixture, and secondary diamines and, in a minor amount, for example up to 20 equivalent percent, based on the secondary amines, of primary/secondary or diprimary diamines may additionally be used.

To prepare component (b), primary diamines of not less than 4 carbon atoms are condensed with mono- and/or dicarboxylic acids of not less than 6 carbon atoms. Examples of suitable diamines are 1,4-diaminobutane, 1,5-diaminopentane, 1,6-diaminohexane and 2-methyl-1,5-pentanediamine. Diamines containing ether groups, e.g. 4,9-dioxadodecane-1,12-diamine and 4,7,10-trioxatridecane-1,13-diamine, may also be used.

Examples of suitable monocarboxylic acids are alpha-ethylhexanoic acid, isononanoic acid, caprylic acid, capric acid, stearic acid, linoleic acid, linolenic acid and benzoic acid.

Examples of suitable dicarboxylic acids are adipic acid, sebacic acid, nonanedicarboxylic acid, decanedicarboxylic acid, dodecanedicarboxylic acid and preferably dimerized unsaturated $C_{10}$–$C_{24}$-fatty acids (dimer fatty acids), e.g. Pripol® 1014 from Unilever, and phthalic acid and terephthalic acid, as well as mixtures of these carboxylic acids.

Although monocarboxylic acids may be employed alone, it is in general advantageous if dicarboxylic acids are concomitantly used. On the other hand, dicarboxylic acids can be used alone, this leading in many cases to excellent binders; however, it is often advantageous if minor amounts of monocarboxylic acids are also present.

The reaction of the diamines with the carboxylic acids is generally carried out at from 100° to 250° C., preferably from 150° to 200° C. To facilitate removal of the water formed during the condensation reaction, a solvent which is suitable as an entraining agent e.g. toluene or xylene, may be added. The carboxylic acids may also be used in the form of their esters. In this case, instead of water, an alcohol is eliminated during the condensation. Instead of fatty acids, it is therefore also possible to use fats, i.e. the glycerol esters of the fatty acids. To prepare component (b), the primary diamine and the carboxylic acids are used in amounts such that the ratio of the number of equivalents of $NH_2$ to that of COOH is from about 2:1 to 10:1, preferably from 2.5:1 to 5:1. The fact that, depending on the ratio of the numbers of equivalents employed, the product contains a larger or smaller amount of free diamine does not present problems and, on the contrary, may even be desirable in many cases.

Components (a) and (b) are reacted with one another in a ratio such that one or more primary amino groups of the condensate (b) are employed by a free epoxide group of the adduct (a). To limit the molecular weight, it is appropriate in most cases to use more than one primary amino group, e.g. from 1.05 to 1.5 primary amino groups, per free epoxide group of the adduct (a). The excess amount depends on the level of the desired molecular weight of (A), which is about 500–10,000, preferably about 1,500–5,000. When condensates (b) possessing primary amino groups and containing a large amount of monocarboxylic acids are used, the excess of primary amino groups over epoxide groups can of course be chosen to be smaller than in the case of condensates which contain exclusively or predominantly dicarboxylic acids.

The reaction of components (a) and (b) can be carried out at room temperature; however, it is advantageous to choose a higher temperature of up to about 150° C., preferably up to about 120° C., in order to accelerate the reaction. A reaction time of 2 hours at from 70° to 90° C. is generally sufficient.

Suitable components (B) are essentially any crosslinking agents which can be used in cathodic electrocoating finishes.

Examples of suitable crosslinking agents (B) are aminoplast resins, such as urea/formaldehyde resins, melamine resins or benzoguanamino resins, blocked isocyanate crosslinking agents, crosslinking agents which undergo curing via esteraminolysis and/or transesterification and contain on average not less than two activated ester groups per molecule, e.g. $\beta$-hydroxyalkyl ester crosslinking agents according to European Patent No. 40,867 and carbalkoxymethyl ester crosslinking agents according to German Patent Application P 32 33 139.8, and urea condensates as described in German Laid-Open Application DOS No. 3,311,514.

The ratio of components (A) and (B) depends on the type and number of groups capable of undergoing crosslinking in the two components. In general, a ratio of (A) to (B) of from 1:1 to 9:1, preferably from 1:1 to 5:1, particularly preferably from 1.5:1 to 4:1, is used.

To prepare coating materials, further substances, such as pigments, assistants, solvents and curing catalysts can be added to the binder.

The coating materials prepared in this manner can be applied to substrates such as wood, glass, plastic or metal by conventional methods, such as spraying, immersion, casting or knife coating.

The coatings are cured at from 80° to 220° C. for from 40 to 3 minutes, depending on the type of crosslinking agent.

After protonation with an acid, the novel binders are water-dilutable and can be applied not only in a conventional manner but also by cathodic electrocoating. This procedure can be used to coat electrically conductive substrates, such as metal articles or sheets of brass, copper, zinc, aluminum, iron or steel, which may or may not be chemically pretreated, e.g. phosphatized.

The binders can be protonated using inoranic or organic acids. Formic acid, acetic acid, propionic acid, lactic acid and phosphoric acid are suitable for this purpose.

For cathodic electrocoating, the solids content of the electrocoating bath is generally brought to 5–45, preferably 10–30% by weight. Deposition is usually effected at from 15° to 40° C. for from 30 to 360 seconds. The pH of the bath is generally brought to 4.5–9.0, preferably 5.0–8.0, particularly preferably 6.8–8.0. The deposition voltage is set at 50–500 volt. The article to be coated is made the cathode, and the deposited film is baked at temperatures higher than 90° C.

Preparation of component (A)

Component (A 1):

First, a condensate (b1) was prepared. To do this, 5,800 g of hexamethylenediamine, 7,250 g of a dimer fatty acid (Pripol® 1014 from Unichema) and 1,400 g of linseed oil fatty acid was slowly heated to 195° C. in a laboratory kettle, and water formed during this procedure (540 g) was distilled off. The mixture was cooled to 100° C. and then brought to a solids content of 70% by weight with 5961 g of toluene. The product had an amine number of 197 (mg of KOH/g).

In a second vessel, an adduct (a1) was first prepared from a secondary amine and a polyepoxide compound. To do this, 10 equivalents of a diglycidyl ether based on bisphenol A and epichlorohydrin, having an equivalent weight of 485 (Epikote ® 10001 from Shell), were dissolved in a solvent mixture consisting of 1039 g of toluene and 1039 g of isobutanol, with heating. The 70% strength by weight solution formed was cooled to 60° C., and 300.4 g of methylethanolamine and 128 g of isobutanol were added. The temperature increased to 78° C. in the course of 5 minutes. After this time, 1850 g of the condensate (b1) were added, and the mixture was heated at 80° C. for 2 hours. The product had a viscosity of 2300 mPa.s, measured at 75° C. with a plate and cone viscometer from Epprecht. Component (A 2):

The procedure described for the preparation of (b1) was followed, except that the 1400 g of linseed oil fatty acid were replaced by an additional 1450 g of dimer fatty acid (Pripol 1014). The resulting product (b2) had an amine number of 190 and a solids content of 70% by weight, free hexamethylenediamine being calculated as a solid.

In a separate vessel 1589 g of diglycidyl ether, having an epoxide equivalent weight of 535 and prepared from bisphenol A and epichlorohydrin, were dissolved in 731.3 g of isobutanol. 117.4 g of ethylethanolamine were added at 60° C., the temperature being kept at 70° C. for 45 minutes by initially cooling and subsequently heating. The product is referred to below as adduct (a2). In another vessel 312.4 g of the amidoamine (b2) were initially taken and heated to 80° C. 1108 g of (a2) were then added in the course of 30 minutes, and the mixture was kept at 80° C. for a further 2 hours. The product had a solids content of 70% by weight and a viscosity of 3,400 mPa.s, measured at 75° C. using a plate and cone viscometer.

Component (A 3):

First, a condensate of a diamine and a carboxylic acid was prepared as described for component (A 1). Instead of hexamethylenediamine, 2-methylpentamethylene-1,5diamine was employed. The product (b3) had an amine number of 195 (mg of KOH/g).

In another vessel, 723 g of a diglycidyl ether obtained from bisphenol A and epichlorohydrin (Epikote 1001 from Shell) were dissolved in 367 g of isobutanol, and 63 g of diethanolamine were added at 70° C. The temperature was kept at 70° C. for 90 minutes by initially cooling and subsequently heating. 282.7 g of the condensate (b3) were initially taken in a glass flask, and the above adduct was added in the course of 5 minutes at 80° C., the temperature being kept at the stated value by external cooling. Shortly after the end of the addition, the exothermic reaction died down and it was necessary to supply heat in order to keep the temperature at 80° C. After 2 hours at 80° C., the product had a viscosity of 880 mPa.s, measured at 100° C.

Component (A 4):

In a glass vessel, 737.6 g of an aromatic epoxy resin based on bisphenol A and having an epoxide equivalent weight of 189 (Aralde ® GY 2600 from Ciba-Geigy), 178 g of bisphenol A and 0.24 g of triphenylphosphine were heated to 130° C. while stirring, and kept at this temperature for 3 hours. After cooling, the mixture was diluted with 196.2 g of isobutanol and 196.2 g of toluene. The epoxide value of the solution was 0.181 (equivalents of epoxide/100 g). A mixture of 71.1 g of methylethanolamine and 23.7 g of water was added at 65° C. The temperature increased to 85° C. in the course of 5 minutes. After this time, 443.5 g of the condensate (b1) were rapidly added and the mixture was kept at 80° C. for 2 hours.

Preparation of components (B):

Component (B 1):

504 g of trimerized hexamethylene diisocyanate were dissolved in 382 g of methyl isobutyl ketone. 388 g of dibutylamine were added dropwise at 70° C., while cooling. Stirring was continued until the isocyanate value was close to zero. The product had a solids content of 70% by weight.

Component (B 2):

67 g of trimethylolpropane, 550.8 g of urea and 2322 g of di-n-butylamine were initialLy taken. The internal pressure was brought to 4 bar with nitrogen, and the temperature was increased to 140° C., while stirring. The internal pressure was kept constant at 4 bar. After about 0.5 hour, the internal temperature was increased to 165° C., and 522 g of hexamethylenediamine were forced into the kettle with nitrogen in the course of 1 hour. After the end of the addition, the mixture was heated to 210° C., the internal pressure still being maintained at 4 bar. After a total reaction time of 8 hours, the mixture was cooled to about 190° C., the pressure was let down and excess di-n-butylamine was distilled off. Thereafter, the mixture was cooled to 100° C. and diluted with methyl isobutyl ketone so that a colorless to slightly yellowish liquid having a solids content of 80% by weight was formed. Component (B 3):

The polyester from Example II(d) of European Patent 40,867 was prepared, the said polyester undergoing crosslinking via transesterification.

EXAMPLES 1 TO 6

Preparation of dispersions:

Components (A) and (B) were mixed in the stated ratios, and 10% strength by weight acetic acid was added. The dispersion was then prepared by slowly adding water, with stirring.

| Dispersion of example | Component (A) | Component (B) | 10% strength by weight acetic acid | Water |
| --- | --- | --- | --- | --- |
| 1 | 695 g (A 1) | 260 g (B 2) | 160 g | 3121 g |
| 2 | 695 g (A 1) | 298 g (B 1) | 160 g | 3083 g |
| 3 | 695 g (A 2) | 260 g (B 2) | 160 g | 3121 g |
| 4(*) | 695 g (A 3) | 208 g (B 3) | 180 g | 3153 g |
| 5 | 695 g (A 3) | 260 g (B 2) | 160 g | 3121 g |
| 6 | 695 g (A 4) | 260 g (B 2) | 160 g | 3121 g |

(*)before the addition of water, 15 g of lead octoate (24% by weight of Pb) were added Pigment paste:

168.7 g of butylglycol, 600 g of water and 16.5 g of acetic acid were added to 525.8 g of component (A 1). 800 g of titanium dioxide, 11 g of carbon black and 50 g of basic lead silicate were then added, and the mixture was milled on a ball mill to a particle size of less than 9 μm.

The solids content was then brought to 49% by weight with water.

Electrocoating baths:

764 g of the pigment paste was added to each of the stirred dispersions. The baths were stirred for 120 hours at 28° C. Coating films were deposited in the course of 120 seconds at the stated voltage onto zinc-phosphatized steel test panels which had been made the cathode, and the said films were baked for 20 minutes at 170° C. The table below shows the results of the coating test.

temperature but reacts with the latter at elevated temperatures with crosslinking.

Results of coating test, layer thickness 17 μm

| Example | pH | Voltage | Throwing power according to Ford (cm) | Cupping[2] (Nm) | Salt spray test according to ASTM under-penetration of the crack | Coating surface[1] |
|---------|------|---------|---------------------------------------|-----------------|------------------------------------------------------------------|--------------------|
| 1 | 7.6  | 300 V | 22.0 | 18.08 | after 500 hours 0.1 mm | 1 |
| 2 | 7.6  | 300 V | 21.0 | ″ | after 500 hours 0.2 mm | 1 |
| 3 | 7.55 | 310 V | 22.0 | ″ | after 500 hours 0.2 mm | 2 |
| 4 | 7.2  | 320 V | 20.5 | ″ | after 500 hours 0.3 mm | 2 (dull) |
| 5 | 7.3  | 300 V | 20.5 | ″ | after 500 hours 0.1 mm | 1-2 |
| 6 | 7.8  | 320 V | 24.0 | ″ | after 500 hours 0.1 mm | 1 |

[1]Rated on a scale from 1 (very good) to 6 (inadequate)
[2]Measured using a mandrel impact tester from Gardner, according to ASTM D 2794.

We claim:
1. A binder for cathodic electrocoating which is based on polyadducts/polycondensates which carry basic nitrogen groups and are rendered water-dilutable by protonation with an acid and one or more crosslinking agents for these polyadducts/polycondensates, essentially consisting of a mixture of
   (A) from 50 to 90% by weight of a polyadduct/polycondensate which carries basic nitrogen groups and is obtainable by reacting
      (a) an adduct of a secondary amine and a polyepoxide compound having 1,2-epoxide groups, the adduct still containing free 1,2-epoxide groups, with
      (b) a condensate which contains primary amino groups and is obtained from a primary diamine of not less than 4 carbon atoms and one or more carboxylic acids of not less than 6 carbon atoms selected from the group consisting of monocarboxylic acids, dicarboxylic acids and mixtures thereof, with the proviso that one or more primary amino groups of the condensate (b) are used per free epoxide group of the adduct (a), and
   (B) from 10 to 50% by weight of a crosslinking agent which does not react with component (A) at room

2. The binder of claim 1, wherein the dicarboxylic acid used for the preparation of component (b) is a dimerized, unsaturated $C_{10}$–$C_{24}$-fatty acid ("dimer fatty acid").

3. The binder of claim 1, wherein the monocarboxylic acid used for the preparation of component (b) is a saturated or unsaturated $C_8$–$C_{24}$-fatty acid.

4. The binder of claim 1, wherein a dialkylamine which contains 2 to 36 carbon atoms and may also contain functional groups is used as the secondary amine for the preparation of the adduct (a).

5. The binder of claim 1, wherein the crosslinking agent (B) is a polyvalent blocked isocyanate, an aminoplast resin or phenoplast resin, a polyaminomethylated polyphenol, a crosslinking agent which undergoes curing via esteraminolysis or transesterification or esteraminolysis and transesterification, or a urea condensate.

6. An aqueous cathodic electrocoating bath containing from 5 to 30% by weight of a binder as defined in claim 1.

7. An article which is provided with a coating and obtained using a binder as defined in claim 1.

8. The binder of claim 1, wherein the polyepoxide compound wiht 1,2-epoxide groups used for the preparation of component (a) is a diglycidyl ether of bisphenol A, having an epoxide equivalent weight of about 180–2500.

* * * * *